United States Patent [19]
Souslin et al.

[11] 3,863,867
[45] Feb. 4, 1975

[54] THRUST CONTROL APPARATUS FOR A JET PROPULSION ENGINE AND ACTUATING MECHANISM THEREFOR

[75] Inventors: Richard Ervin Souslin; James E. Klansnic, both of Bellevue; Charles Kahler, Kirkland, all of Wash.

[73] Assignee: The Boeing Company, Seattle, Wash.

[22] Filed: Dec. 26, 1973

[21] Appl. No.: 428,308

[52] U.S. Cl. .............. 244/12 D, 60/226 A, 60/230, 239/265.19, 239/265.29, 244/53 R, 244/110 B
[51] Int. Cl. ............................................ B64c 15/06
[58] Field of Search. 244/12 R, 12 D, 23 D, 42 CC, 244/52, 53 R, 110 B; 60/226 A, 229, 230; 239/265.13, 265.19, 265.25, 265.29, 265.33, 265.35, 265.37

[56] References Cited
UNITED STATES PATENTS

| | | | |
|---|---|---|---|
| 2,735,264 | 2/1956 | Jewett | 239/265.37 |
| 3,126,171 | 3/1964 | Stepniewski et al. | 244/12 D |
| 3,791,586 | 2/1974 | Moorehead | 239/265.37 |
| 3,806,068 | 4/1974 | Blythe et al. | 244/12 D X |

*Primary Examiner*—Duane A. Reger
*Assistant Examiner*—Barry L. Kelmachter
*Attorney, Agent, or Firm*—Christenson, O'Connor, Garrison & Havelka

[57] ABSTRACT

An aircraft, employing upper surface blowing to augment and supplement aerodynamic lift for short take-off and landing (STOL) operation, has a turbofan jet propulsion engine cantilevered in a forward position on each wing. In the STOL mode the engine exhaust is discharged rearwardly over the upper airfoil surface of the wing and is turned downwardly over extended trailing edge flaps by the Coanda effect to augment lift. On approach for a short landing a portion of the fan air from the engine is diverted through vectoring channels and is directed downwardly and forwardly. The diverted fan air by its rearward thrust component provides a subtractive effect on the forward drive thrust of the engine to reduce forward air speed while its upward thrust component compensates for the reduction in aerodynamic lift attending reduced forward air speed. By selectively diverting a portion of the fan air the aircraft can achieve a steep angle of descent while maintaining a relatively low rate of descent. The resulting glide path can be varied by altering the magnitude and angle of the diverted fan air stream as well as by engine power and flap setting variations. An exhaust reversing door, incorporated in the engine exhaust nozzle, includes a lip door mounted at the rearward, upper portion thereof which throttles the rearward exhaust flow to maintain engine load matching when the vectoring channels are opened. Actuating linkage for operating the lip door is connected between fixed engine structure and the lip door in such a manner so as not to interfere with the operation of the reversing door.

10 Claims, 7 Drawing Figures

THRUST CONTROL APPARATUS FOR A JET PROPULSION ENGINE AND ACTUATING MECHANISM THEREFOR

BACKGROUND OF THE INVENTION

The present invention relates to thrust control apparatus and more particularly to apparatus in combination with a jet propulsion engine, which generates forward thrust by rearward discharge of a primary gas stream, for diverting a portion of the thrust producing gases generated by the engine and directing the gases downwardly and forwardly with respect to the primary gas stream. Specifically, the invention relates to means and actuating mechanism for throttling the rearward flow of the primary gas stream as a portion of the thrust producing gases is diverted downwardly and forwardly.

Short takeoff and landing (STOL) aircraft have been developed to fulfill a need for aircraft which have a relatively high speed capability but which can take off and land in relatively short distances. Many STOL aircraft utilize powered lift, i.e., augmentation of aerodynamic lift by a thrust component, to provide the STOL capability. One method for augmenting aerodynamic lift utilizing a jet propulsion engine is to direct the primary exhaust stream from the engine chordwise across an upper airfoil surface of a wing and across downwardly and rearwardly curved trailing edge wing flaps. The exhaust stream is tuned downwardly by the Coanda effect and exits in a rearward and downward direction from the flaps. An example of a configuration for utilizing this method, known as upper surface blowing, is disclosed in U.S. Pat. No. 3,018,983.

The ability to achieve a steep guide path is important for all aircraft, but especially for STOL aircraft. Control over the glide path is also very important because it affects the ability of the pilot to land the aircraft at a selected spot on a landing field. The guide path or approach angle is determined by the forward speed of the aircraft and the vertical rate of descent of the aircraft. Forward speed is a function of forward thrust on the aircraft and the rate of descent is a function of lift on the aircraft. In conventional fixed wing aircraft employing only aerodynamic lift, an alteration in the forward speed, controlled by engine throttle movements which vary the forward thrst, will vary the lift. Thus, as the forward speed is reduced or increased, the aerodynamic lift derived from a fixed wing is concomitantly reduced or increased.

Powered lift STOL operation differs from conventional aircraft operation in that an attempt to alter guide path by varying the forward thrust will not only alter the aerodynamic lift but will also alter the lift augmentation derived from thrust vectoring. A STOL aircraft which can attain a steep approach angle only at very low power settings may lose much of the desired lift augmentation, resulting in an undesirably high rate of descent. In addition, bleed air for boundary layer control used on some aircraft will be limited, decreasing available aerodynamic lift and further increasing the rate of descent. When operating STOL aircraft, as well as other aircraft, it is therefore desirable to be able to decrease forward speed in order to approach the landing site at a steep angle and at the same time to maintain a relatively low rate of descent.

One means for decreasing forward speed to increase the approach angle is to divert a portion of the thrust producing gases from a jet propulsion engine in a downward and forward direction, relative to the forward motion of the aircraft. Resultantly, the forward thrust vector is reduced by the rearward thrust vector component of the diverted gases while the lift is augmented by the upward thrust vector component of the diverted gases. When a portion of the gases from the engine are so diverted, the amount of gases directed rearwardly from the engine is reduced, requiring in many instances a reduction in the flow area of the rearward exhaust nozzle of the engine to maintain engine substantially constant loading. Apparatus and methods for accomplishing the foregoing are disclosed and claimed in a pending application to Charles Kahler and William H. Cook, entitled Thrust Control Apparatus for a Jet Propulsion Engine, Ser. No. 428,343; filed concurrently herewith, and expressly incorporated herein by reference.

It is a broad object of the present invention to provide thrust control apparatus for a jet propulsion engine which includes mechanism for throttling the rearward flow of thrust producing gases from the engine while diverting a portion of the thrust producing gases in a downward and forward direction in order to match the load on the engine under such operating conditions relative to the load on the engine under normal operating conditions wherein all thrust producing gases are directed rearwardly from the engine. It is a further object of the invention to provide such throttling mechanism on a jet propulsion engine which is configured to augment and supplement aerodynamic lift through upper surface blowing. More specifically, it is an object of the invention to provide such throttling mechanism which is operative conjunctively with thrust reversing apparatus on such a jet propulsion engine, and to provide such throttling mechanism which can be linked to actuating means operative in conjunction with fixed engine structure, without interfering with the normal operation of the thrust reversing apparatus.

SUMMARY OF THE INVENTION

In accord with the foregoing objects, and other objects which will become apparent upon reading the following specification the present invention provides a thrust control apparatus in combination with a jet propulsion engine which develops thrust by discharge of a primary gas stream. The engine includes a propulsive gas flow duct which terminates rearwardly of the engine in an exhaust nozzle, which nozzle directs the gas stream rearwardly from the engine. A conduit, having an inlet in fluid communication with the flow duct and an outlet in fluid communication with the atmosphere, is so associated and oriented in relation to the engine to divert a portion of the propulsive gas from the engine and to direct it downwardly and forwardly relative to the discharge direction of the primary gas stream. A valve means is mounted on the engine and is located relative to the conduit means to selectively vary the flow of propulsive gas through the conduit means. A thrust reversing door, associated with the exhaust nozzle of the engine, is mounted for swinging movement about a first axis transverse to the discharge direction of the primary gas stream. The reversing door is movable between a first position in non-interfering relationship with the nozzle and a second position located rearwardly and downwardly of the first position to block the rearward flow of the primary gas stream and to divert it upwardly and forwardly from the engine. A throttling means is mounted on the reversing door means and is so associated therewith to selectively reduce the outlet area of the exhaust nozzle when the reversing door is in the first position and when propulsive gas is being diverted through the conduit means. In one aspect of the invention an actuating means is so coupled between the valve means and the throttling means to cause the valve means to open the conduit means as the throttling means reduce the outlet area of the exhaust nozzle. In another aspect the throttling means and actuating means are so designed to allow the thrust reversing door to operate without interference from the throttling means when the latter is nonoperative. One embodiment of this aspect of the invention is realized by a throttling means which comprises a panel mounted on the thrust reversing door for swinging movement about an axis substantially parallel with the mounting axis of the reversing door. The panel is movable between a first position in noninterfering relationship with the exhaust nozzle and a second position located downwardly and rearwardly from the first position to reduce the outlet area of the nozzle. In this embodiment the actuating means includes linkage pivotally connected to supporting structure on the panel for pivotal movement about an axis coincident with the mounting axis of the reversing door. In this manner the reversing door can be moved to and from a reversing position, carrying the restricting door as it moves, without provision of special or separate restricting door actuating means.

DESCRIPTION OF PREFERRED EMBODIMENTS

Figure 1:
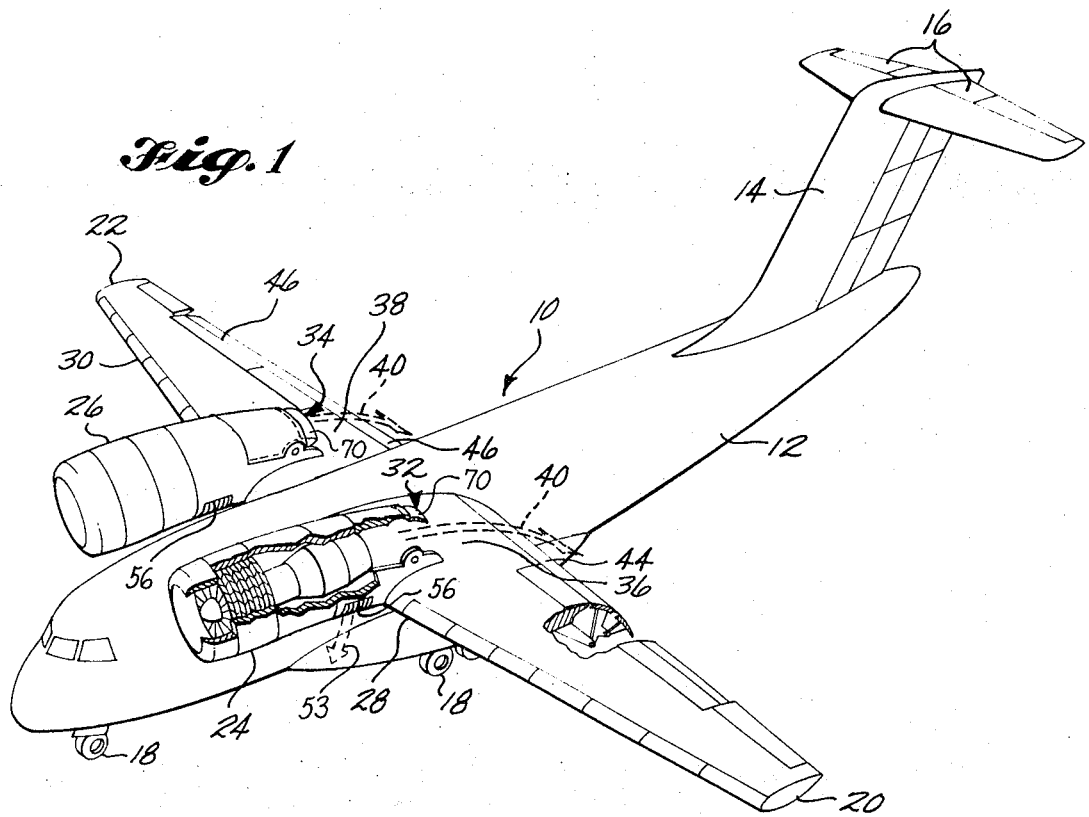
FIG. 1 is an isometric view of a STOL aircraft employing engines which embody the thrust control apparatus of the present invention.

Referring to FIG. 1 the STOL aircraft 10 includes a body 12, a vertical stabilizer 14 and horizontal stabilizers 16. Suitable landing gears 18 support the body 12 of the aircraft on the ground. High mounted left and right wings, 20 and 22 respectively, are connected in a conventional manner to the body 12. Left and right turbofan engines, 24 and 26 respectively, are mounted inboard on the respective wings at positions very close to the body 12 to improve the single engine performance characteristics of the aircraft. The engines 24 and 26 are cantilevered on struts (not shown) so that the major portion of each of the engines is located above and forwardly of the respective leading edges 28 and 30 of the wings. The exhaust nozzles 32 and 34 of the engines open onto the respective upper airfoil surfaces 36 and 38 so that the exhaust streams from the engines are discharged chordwise across the wings.

The engines 24 and 26 are located with respect to the wings 20 and 22 to take advantage of lift augmentation through upper surface blowing. In a cruise mode of operation the exhaust streams are discharged rearwardly from the engines in a longitudinal direction with respect to the airplane to provide forward thrust. On approach in the STOL mode of operation (as shown in FIG. 1) the trailing edge flaps 44 and 46, which are mounted in a conventional manner on the wings 20 and 22 rearwardly of the engines, are extended to form a smooth rearward and downward curve from the aft portions of the wings. The exhaust gas streams adhere to the surfaces of the flaps by the Coanda effect and are turned in a downward and rearward direction, as indicated by arrows 40. Aerodynamic lift is thus augmented during landing and takeoff since the thrust vector acting on the aircraft has both an upward and a forward component. Also in the STOL mode of operation supercirculation, the aerodynamic lift-increasing effect of distortion of airflow over the airfoil caused by an exhaust stream exiting downwardly and rearwardly from the trailing edge of the aft portion of the flaps, supplements conventional aerodynamic lift.

Upon approach to landing when operating in the STOL mode a portion of the thrust producing gases generated by the engines 24 and 26 is diverted into channels 56, located in the engine assemblies forwardly of the exhaust nozzles 32 and 34, and is directed downwardly and forwardly with respect to the aircraft. One of the diverted exhaust streams is indicated by arrow 53 as it is so discharged downwardly and forwardly from left engine 24. As explained in detail below, each of the engines has two such diverting channels 56, providing three additional downwardly and forwardly directed exhaust streams similar to that indicated by arrow 53. When a portion of the exhaust stream is so diverted, the resulting thrust vector is directed upwardly and rearwardly with respect to the aircraft. The rearwardly directed component of the thrust vector has a subtractive effect on the forwardly directed thrust component resulting from the remaining portion of the exhaust stream discharged rearwardly from the engine. The upwardly directed component of the thrust vector is additive to the lift components derived from the exhaust stream flowing downwardly and rearwardly over the flaps and to the lift components resulting from aerodynamic lift.

Through appropriate design variations the magnitude and angle of the downwardly and forwardly diverted exhaust streams can be chosen so that at a given engine power level the lift component of the diverted gas stream can compensate for the loss of aerodynamic lift attendant a reduction in forward air speed. The overall effect on the aircraft of diverting exhaust gases through the channels 56 is one of reduced forward speed accompanied by little, if any, variation in total lift. Thus at high engine power settings, a steep approach angle accompanied by a relatively low descent rate can be achieved. In the approach mode of operation both lift and forward thrust can be varied by adjusting engine power settings or by partially retracting and extending the trailing edge flaps, resulting in variable control over the approach angle and the rate of descent. The total forward lift and thrust can also be altered by selectively varying the magnitude and direction of the diverted gas streams.

In accord with the present invention when the aircraft is operating in an approach mode, restricting doors 70, mounted inside of the upper portion of the exhaust nozzles 32 and 34, are extended rearwardly and downwardly. The restricting doors reduce the outlet area of the exhaust nozzles as a portion of the thrust producing gases is diverted from the engines through the channels 56. As is known, some jet propulsion engines, including turbofan engines, do not function properly or operate at maximum efficiency and thrust for a given power setting unless the exhaust outlet area is properly sized for a given engine. Thus, when the diverting channels 56 are opened the overall outlet area of the engines 32 and 34, is increased. Depending upon the particular engine being employed, such an increase in outlet area can cause the engine to surge and under some conditions becomes inoperative. It, therefore, becomes not only desirable, but also necessary under such circumstances to reduce the outlet area of the rear nozzles 32 and 34. The present invention accomplishes this end by mounting the movable restricting doors 70 on the nozzles to reduce their outlet area, as is described in greater detail below.

The left and right engines 24 and 26 are alike. Left engine 24, shown in FIGS. 2 through 6 has been chosen as representative of both to illustrate the preferred embodiment of the thrust control apparatus of the present invention. An engine of the mixed flow turbofan type is preferably employed with the present invention for several reasons. Among these reasons are the high mass flow exhaust generated by the turbofan engine and the availability of relatively cool fan air for diversion through the diverting channels 56. Referring to FIGS. 2 through 5, this engine incorporates a gas turbine 50 having a rear turbine exhaust through which the gaseous combustion products of fuel and air are expanded. The gas turbine drives a low pressure fan which conventionally surrounds the forward portion of the turbine 50. The nacelle 54 forms the outer shell of the engine. The inner wall of the nacelle is spaced from and surrounds the turbine in a radial direction. Air is supplied to both the turbine 50 and the low pressure fan through the engine air inlet, defined by the forward protion of the nacelle. The exhaust nozzle 32 forms a rearward extension of the nacelle 54 for discharging an exhaust stream rearwardly from the engine. Low pressure air compressed by the fan travels through an annular fan duct 52, defined between the turbine 50 and the nacelle 54, and combines with the exhaust gases from the turbine 50 in the exhaust nozzle 32 in the region forwardly of the rearward discharge opening of exhaust nozzle 32. Although a turbofan engine of the type described above is preferred, other types of jet propulsion engines which discharge an exhaust stream from a nozzle, such as a ducted fan driven by a prime mover other than a gas turbine, can be used with the present invention.

A pair of thrust vectoring conduits or channels 56 are located in the lower portion of the nacelle 54 on respectively opposite sides of the engine 24. The inlets to the channels 56 communicate with the annular fan duct 52. Preferably, the inlets to channels 56 are located forwardly of the outlet from the turbine 50 so that only relatively cool fan air is diverted through the channels 56, eliminating the necessity for using costly heat resistant materials in the channel walls. The channels 56 extend downwardly from the fan duct to the exterior of the nacelle and are curved first in the rearward direction and then in a forward direction. This channel shape improves the flow of fan air through the channels while causing the exhaust stream to issue from the channel outlets in a forward and downward direction. Flow turning vanes 62 are mounted in the channels 56 to assist in directing the diverted exhaust streams in a forward and downward direction.

Modulation of the flow of fan air through channels 56 is controlled by valves, which in this embodiment comprise movable doors 60 slidably mounted in suitable tracks 94 located in the nacelle 54. Because of the location of the channel inlets and because of the configuration of the outer wall of the annular fan duct 52, it is not necessary to place a door at the inlet to channels 56. When the doors 60 are closed, air under pressure in the channels will deflect fan air past the channel inlets with little energy loss. The movable doors 60, sometimes hereafter referred to as vectoring doors, are actuated between open and closed positions by movement of the linkage, generally designated 76.

The exhaust nozzle 32, which is connected by conventional means to the rearward portion of the nacelle 54 along joint 61, has a forward section 59, a lower rearward section and an upper rearward section. The forward section is a generally rounded annularly shaped piece which abuts the rear portion of the nacelle 54 along joint 61 and is fixed to the nacelle by conventional means (not shown). The forward section receives the fan air from fan duct 52 and directs it rearwardly along with the turbine exhaust into the upper and lower rearward sections of the nozzle. The lower rearward section of the nozzle is integral with the forward section of the nozzle and includes an inner bottom wall 63, the forward portion of which merges with the bottom wall of the forward section of the nozzle. The bottom wall of the lower section from its central forward portion is upwardly curved in transverse section toward the mutually opposing sides thereof. The bottom wall extends rearwardly and upwardly from the forward section of the nozzle while the curve of the bottom wall in transverse section gradually flattens to merge with the upper airfoil surface 36 of the wing 20. Transversely spaced fairings 66 form the fixed side walls of the lower section of the nozzle 32. The fairings are fixed to and extend upwardly from the bottom wall 63 and upper airfoil surface 36 and extend forwardly from a location rearwardly of the reversing door for affixation to the lower, rear, side portions of the forward section 59 of the nozzle 32.

The upper section of the exhaust nozzle includes a thrust reversing door 64 and a restricting door 70. The thrust reversing door is an inverted channel of rounded, inverted U-shaped cross-section having transversely spaced sidewalls which merge at the top portions thereof with an upper wall in a smooth upward and inward curve. In the position shown in FIG. 2, the forward edge of the reversing door abuts the forward section of the nozzle 32 along joint 67, but is not affixed thereto. The bottom edges of the reversing door sidewalls join with the top edges of the fairings 66 to form continuous sidewalls for the nozzle 32. Transversely extending, mutually aligned mounting pins 69 (best seen in FIG. 6) are secured to respective transversely spaced fairings 66. The sidewalls of the reversing door 64 are pivotally secured to pins 69 thereby mounting the reversing door for fore and aft swinging movement about an axis transverse to the normally rearward discharge direction of the exhaust stream from the nozzle 32.

Figure 2:
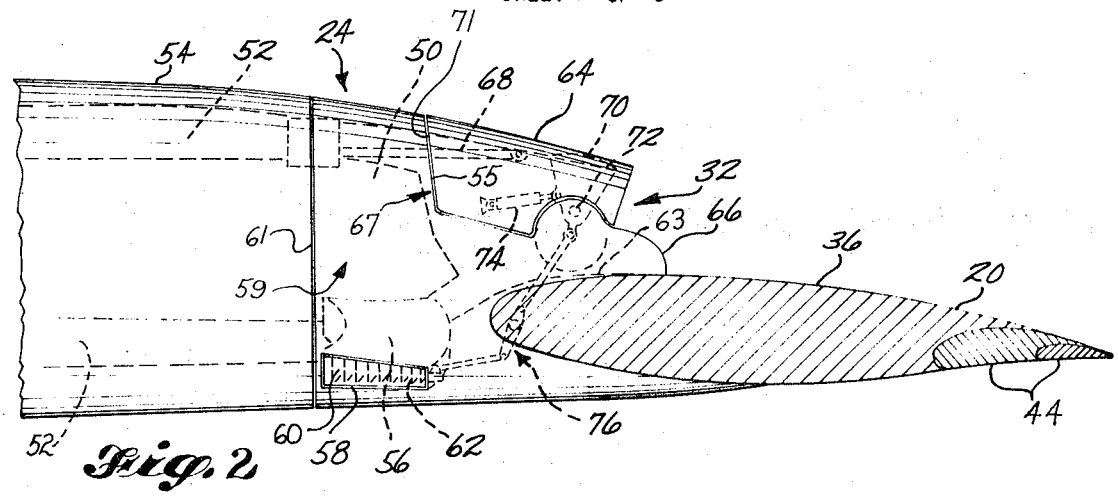
FIG. 2 is a side elevation view in partial longitudinal section of an engine, wing, and trailing edge flaps of the aircraft of FIG. 1 showing the thrust control apparatus as positioned in a cruise mode of operation.
Figure 3:
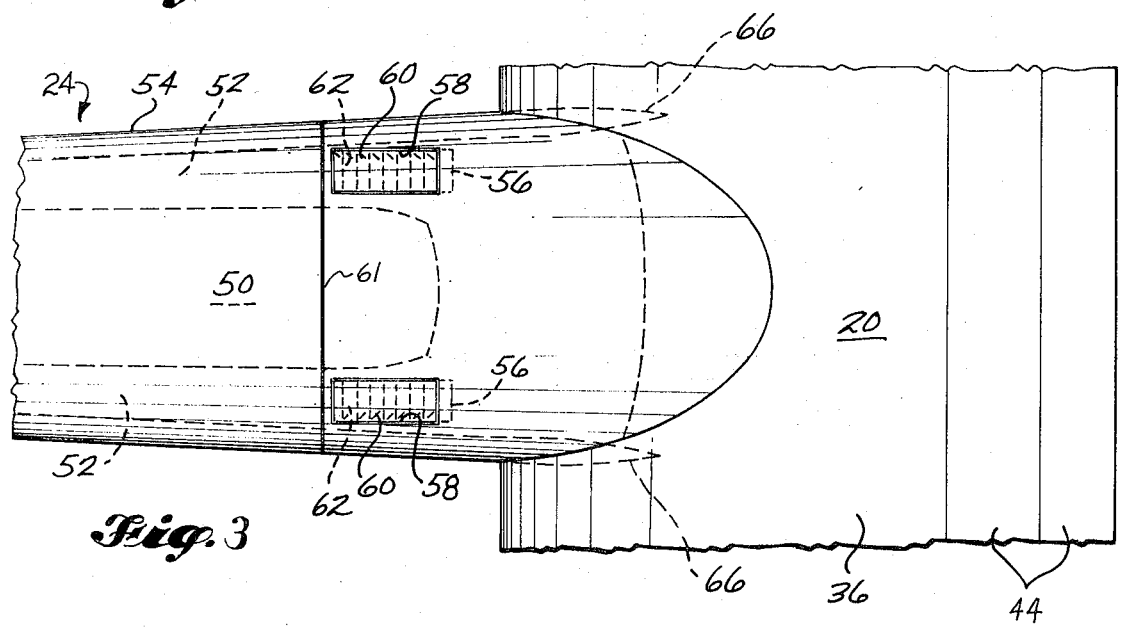
FIG. 3 is a bottom view of the apparatus of FIG. 2.
Figure 5:
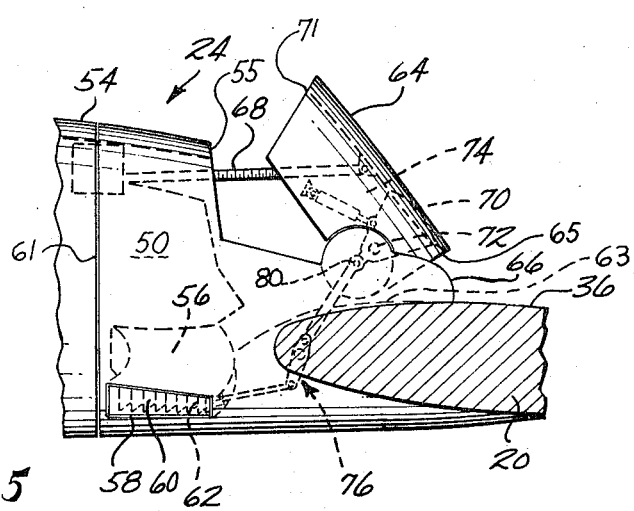
FIG. 5 is a side elevation view in partial longitudinal section of an engine and wing similar to FIG. 2 showing the thrust control apparatus positioned in a reversing mode of operation.
Figure 6:
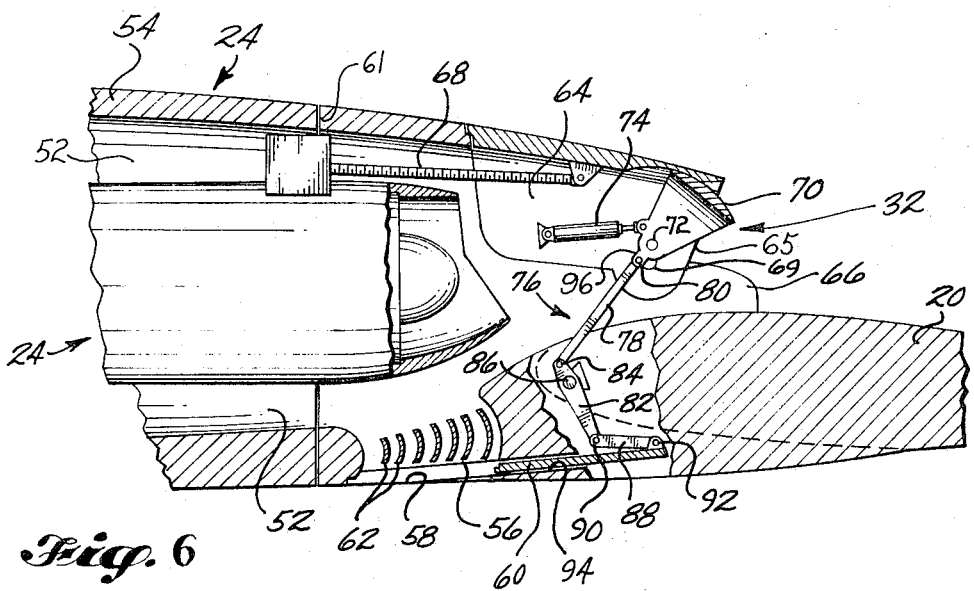
FIG. 6 is a view in partial longitudinal section taken along a section line similar to 6—6 in FIG. 4 showing the thrust control apparatus in a STOL approach mode of operation.

The thurst reversing door 64 serves two purposes. First, it functions in a cruise and STOL position as shown in FIGS. 2 and 6 to direct exhaust gases rearwardly from the engine chordwise across the airfoil surface 36 providing forward thrust for the aircraft. In a STOL mode of operation the reversing door is in the same position as when the aircraft is operating in cruise mode. Second, it functions in a reversing position as shown in FIG. 5 to divert the total exhaust flow from the engine and direct it in an upward and forward direction relative to the engine. In the reversing position the direction of the thrust produced by the engine is reversed to the aircraft to aid in braking upon landing. The reversing door 64 is powered for fore and aft pivotal movement between the reversing and cruise positions by a linearly extensible actuator 68. As shown, the actuator is of the jackscrew type having a motor section attached to the outer shell of the turbine, and an extensible screw rod, pivotally attached at its free end to the bottom central portion of the top wall of the reversing door 64. When the motor section is actuated (by means not shown) the rod causes the reversing door to move between the cruise position and the reversing position. Other suitable actuators can be used as desired, such as a fast acting hydraulic or pneumatic actuator.

In the cruise position as shown in FIGS. 2 and 5, the forward edge 71 of the reversing door 64 abuts the rearward edge 55 of the upper portion of the forward section of the nozzle 32. The restricting door 70 is located forwardly of the rearward edge 65 of the reversing door in nested relationship with the reversing door. A recess is provided in the inside of the top wall of the reversing door adjacent its rearward edge to receive the upper panel of the restricting door. The bottom surfaces of the top wall of the reversing door and the upper panel form a continuum, thereby positioning the restricting door in a position in which it does not interfere with gas flow within the nozzle. The rearward edge 65 of the reversing door in conjunction with the fairings 66 and the bottom wall 63 of the lower section of the nozzle cooperate to form an exhaust nozzle opening to discharge gases rearwardly from nozzle 32 for cruise operation. In the reversing position as best shown in FIG. 5, the reversing door 64 is pivoted about pins 69 by extension of actuator 68 to a position wherein the rearward edge 65 of the door abuts the top surface of the lower wall 63 of the bottom section of the nozzle. When the door is so moved, the forward edge 71 of the door separates from and is spaced rearwardly and upwardly from the rearward edge 55 of the forward section of the nozzle 32. Thus, the forward edge 71 of the reversing door, the forward, upper edges of fairings 66 and the rearward edge 55 of the forward section of the nozzle cooperate to form a reversing nozzle to direct the exhaust stream from the engine in a forward and upward direction.

Figure 4:
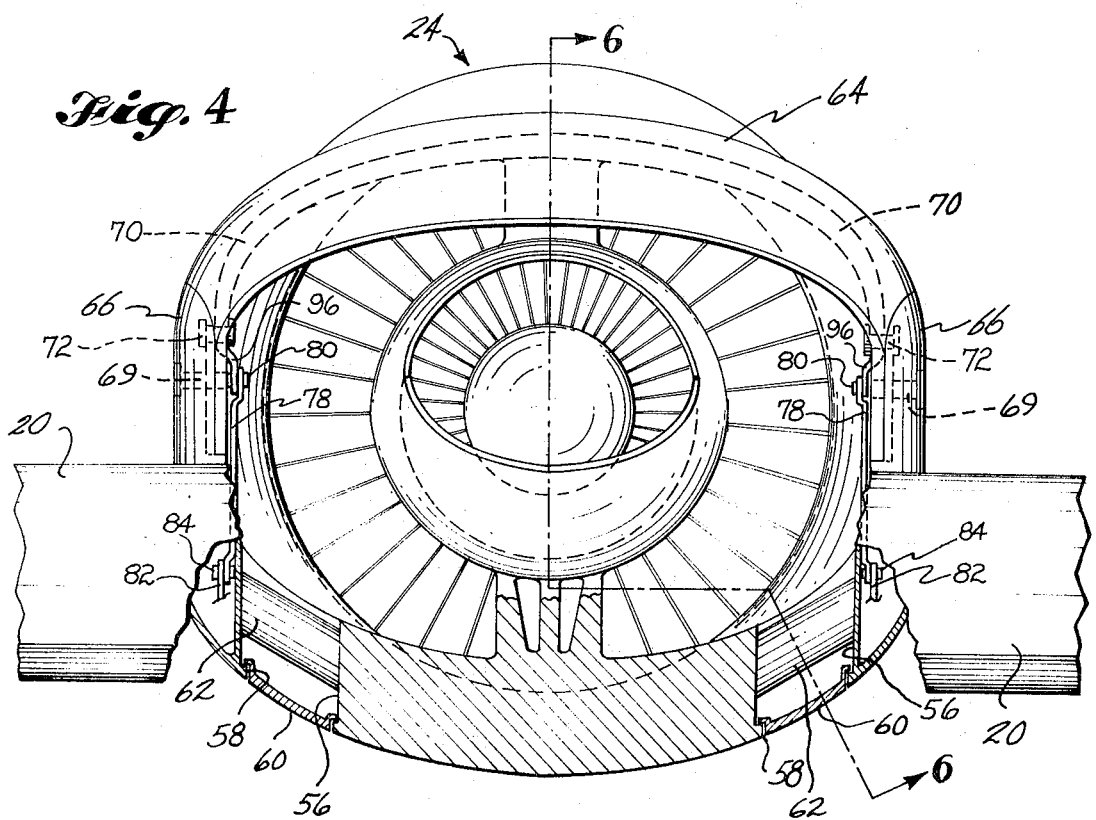
FIG. 4 is an enlarged rear view, partially broken away, of the apparatus shown in FIGS. 2 and 3.

Referring to FIGS. 2, 4, and 5, the restricting door 70, the function of which was described above, is movable mounted for fore and aft swinging movement on the rearward inner portion of the reversing door. The restricting door also is an inverted channel of rounded, substantially U-shaped cross-section, having an upper panel portion extending between the sidewalls of and under the top wall of the reversing door. The top panel portion merges into transversely spaced sidewall portions in mutually opposing, outwardly and downwardly extending smooth curves. The bottom portion of the restricting door sidewalls is pivotally joined to the central rearward portions of respective reversing door sidewalls by respective, transversely aligned pivot pins 72. The pivotal mounting axis of the restricting door 70 as shown is transverse to the normally rearward discharge direction of the exhaust stream from the nozzle 32 and can be, as shown, substantially parallel to the pivotal mounting axis of the reversing door 64. A powered actuator 74 of the linearly extensible type (or any other suitable type as desired) is pivotally connected at one end to one inner wall of the thrust reversing door 64 and is pivotally connected at its other end to a sidewall of the restricting door 70. The power actuator functions with the linkage to actuate both the restricting door and the vectoring door.

In an approach mode of operation the restricting door 70 is moved to an exhaust throttling position and the vectoring doors 60 are opened. As the rod of the actuator 74 is extended the restricting door 70 is pivoted about its mounting axis defined by pins 72 to the throttling position as shown in FIG. 6. In the throttling position the bottom deflecting surface of the restricting door is canted downwardly so that the rearward edge of the restricting door is located downwardly and rearwardly from its cruise position. The forward edge of the restricting door resides adjacent the bottom surface of the upper wall of the thrust reversing door. In this manner the outlet area of the exhaust nozzle is reduced by movement of the restricting door rearwardly about its pivotal mounting axis.

As the restricting door 70 is pivoted to the throttling position, the linkage 76 causes the vectoring door 60 to slide rearwardly in rails 94 to open the outlet 58 to vectoring channels 56 (FIG. 6). The linkage 76 includes a bottom arm 88 which is pivotally connected by pin 92 to a flange extending upwardly from the rearward portion of the sliding vectoring door 60. The bottom arm extends forwardly and upwardly from its connection to the vectoring door to a position where its other end is pivotally connected by a pin 90 to the bottom end of a crank 82. The crank 82 extends upwardly from its connection to bottom arm 90 and is pivotally attached to fixed structure on the wing (or the engine as desired) by pivot rod 86. A top arm 78 is pivotally connected at its lower end to a portion of the crank 82 extending above rod 86, and is pivotally connected at its other end to a flange 96 extending downwardly from a sidewall of the restricting door 70. As can be seen by reference to FIG. 4, similar linkage 76 is situated on each side of the engine and interconnects the right and left sidewalls of the restricting door 70 respectively with the right and left vectoring doors 60. The lower portion of the linkage and the rear portion of the door have been broken away to clarify the door construction described above.

In accord with an aspect of the invention the flanges 96 extend downwardly from the sidewalls of the restricting door 70 to a location below the pivotal connection of the restricting door to the reversing door 64. When the restricting door 70 is in the nested position as shown in FIG. 2, the flanges 96 are transversely offset from the location of the reversing door mounting pins 69, while the pivot pins 80 are mutually aligned and are coincident with the pivotal axis of the reversing door 64 as defined by pivot pins 69. This feature of the invention allows the reversing door to swing between its cruise and reversing positions without being affected by the presence of the restricting door 70, since the interconnecting link 78 will not be moved because the pivotal connection of its upper end is coincident with the swing axis of the reversing door.

On approach to a landing field the restricting door 70 and vectoring door 60 are in their nozzle restricting and open positions, respectively. In accord with this embodiment of the invention, they must be returned to their nested and closed positions, respectively, prior to the time the reversing door 64 is moved from its cruise position. This function can be automatically accomplished through the use of appropraite control circuitry responsive to energization of the actuator 68 which moves the reverser door 64 to its full thrust reversing position.

Figure 7:
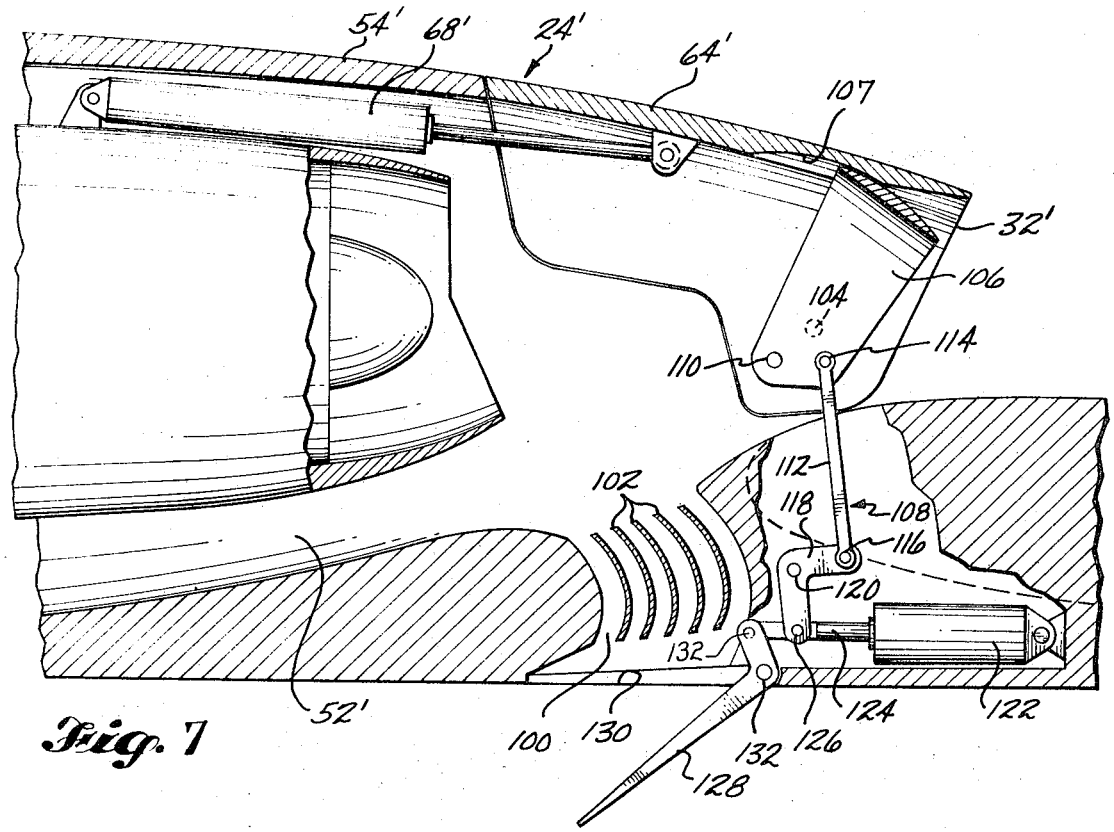
FIG. 7 is a view in partial longitudinal section similar to FIG. 6 showing a second embodiment of the present invention in a STOL approach mode of operation.

In the embodiment of FIG. 7 a diverting channel 100 communicates with a fan duct 52' through the nacelle 54' of the engine 24'. Flow turning vanes 102 are located in the channel 100 to aid in the turning of the fan air through channel 100. The reversing door 63' has a similar construction to that described above and is swung upwardly and rearwardly from the cruise (or STOL) position as shown to a reversing position by extension of actuator 68'. The exhaust nozzle 32' has substantially the same configuration as in the previous embodiment. The reversing door 64' is mounted for swinging movement about an axis transverse to the normal rearward discharge direction of the exhaust stream from the engine by pins 104. Restricting door 106 is also of similar configuration to that of the previous embodiment having its upper panel nested in the recess 108 of the reversing door 64' when in a cruise position.

As shown in FIG. 7, the restricting door 106 has been moved to its restricting position by actuation of the linkage 108. Restricting door 106 is mounted on reversing door 64' to pivot about a pin 110 mounted on the sidewall of the thrust reversing door 64'. The link 112, forming part of linkage 108, is connected at its upper end to the restricting door 106 by pin 114. Similar to the previous embodiment, the pivotal axis of the connecting pin 114 is coincident with the pivotal axis of reversing door mounting pin 104 when restricting door 106 is in the cruise position nested in recess 108. Thus when the restricting door 106 is in its cruise position, the reversing door 64' can be actuated without being affected by the presence of the restricting door or without causing damage to the actuating linkage 108.

In the embodiment of FIG. 7 the actuator 122 is separated from the reversing door and is located inside the wing rearwardly of the engine. The link 112 extends downwardly from door 106 and is pivotally connected to a bell crank 118 at its lower end by a pin 116. Bell crank 118 is in turn pivoted about pin 120, which is affixed to wing structure (or engine structure as desired). A hydraulic actuator mounted to fixed structure on the engine below the wing, has an extensible rod 124 to which the other arm of the bell crank 118 is pivotally connected by pin 126. The vectoring door 128 is pivotally mounted to the nacelle 54' adjacent the outlet 130 from the channel 100. A flange extends upwardly from the rearward end of the vectoring door and is pivotally connected by pin 132 to the end of the actuator rod 124. Thus as the rod 124 is extended from right to left, the crank 118 will be rotated, pulling downwardly on link 112 and swinging the restricting door 106 downwardly and rearwardly to reduce the outlet area of nozzle 32'. Simultaneously, the vectoring door 128, normally covering the opening 130 to passage 100, is pivoted about its mounting pin 132 to an open position as shown. When the rod 124 is moved in the opposite direction, from left to right, the vectoring door 128 and the restricting door 106 are moved to a closed position and a nested position, respectively.

The present invention has been described in relation to a preferred embodiment and an alternate embodiment. It is to be understood that one of ordinary skill in the art can make various changes, substitutions of equivalents, and other alterations to the present invention without departing from the original concept. It is therefore intended that the present invention be limited only by the definition contained in the appended claims.

What is claimed is:

1. Thrust control apparatus in combination with a jet propulsion engine which develops thrust by discharge of a primary gas stream, said engine having a propulsive gas flow duct therein, said duct terminating at the rear end of said engine in an exhaust nozzle which normally directs said primary gas stream rearwardly from said engine, comprising:
   conduit means associated with said engine and having an inlet in fluid communication with said duct and an outlet in fluid communication with the atmosphere, said conduit means being so oriented in relation to said engine as to divert a portion of the propulsive gas from said duct and to direct said portion from said outlet as a secondary gas stream in a downward and forward direction relative to the discharge direction of said primary gas stream,
   valve means mounted on said engine and so located in relation to said conduit means to selectively vary the flow of propulsive gas through said conduit means,
   reversing door means associated with said exhaust nozzle and mounted on said engine for swinging movement about a first axis transverse to the discharge direction of said primary gas stream, said reversing door means being mounted for movement between a first position in noninterfering relationship with said exhaust nozzle and a second position located rearwardly and downwardly of said first position wherein said reversing door means blocks said exhaust nozzle and diverts said primary gas stream for discharge forwardly from said engine,
   throttling means mounted on said reversing door means and so associated therewith to selectively reduce the outlet area of said exhaust nozzle when said reversing door means is in said first position and when a portion of said propulsive gas is being diverted through said conduit means, and
   actuating means mounted on said engine and so coupled to said valve means and to said throttling means to cause said valve means to open said conduit means to flow and to simultaneously cause said throttling means to reduce the outlet area of said exhaust nozzle.

2. The apparatus of claim 1 wherein said throttling means comprises a panel and supporting structure therefor mounted on said reversing door means for swinging movement about a second axis transverse to the discharge direction of said primary gas stream, said panel being mounted for movement between a first position in noninterfering relationship with said exhaust nozzle and a second position located rearwardly and downwardly of said first position to reduce the outlet area of said exhaust nozzle.

3. The apparatus of claim 2 wherein said reversing door means is mounted for pivotal movement about said first axis, said panel and supporting structure being mounted for pivotal movement about said second axis, said first and second axes being spaced from each other, said actuating means including linkage means pivotally connected to said supporting structure on an axis coincident with said first axis when said panel is in said first position, said linkage means being coupled to said valve means, thereby allowing movement of said reversing door means to be unaffected by said throttling means when the latter is in said first position.

4. The apparatus of claim 2 wherein said actuating means further comprising:
power means for moving said panel and supporting structure between said first and second position, said power means being coupled between said reversing door means and said panel and supporting structure.

5. The apparatus of claim 3 wherein said actuating means further comprises:
power means for moving said panel and supporting structure between said first and second positions, said power means being coupled between said linkage means and said engine so that upon actuation of said power means said linkage means will move said panel and supporting structure to said second position and simultaneously move said valve means to a position opening said conduit means to flow of propulsive gas.

6. In a turbofan engine including a turbine having an exhaust outlet, a nacelle having a rearward portion, said nacelle at least in part being spaced from said turbine to define a fan duct therebetween, and a fan driven by said turbine for discharging fan air into said fan duct, apparatus for controlling the flow of exhaust gases from sad engine comprising:
exhaust nozzle means connected to the rearward portion of said nacelle, said exhaust nozzle means so constructed to receive exhaust gases from said turbine exhaust outlet and from said fan duct and to discharge said exhaust gases rearwardly from said engine, said exhaust nozzle means including a bottom section having a bottom wall extending rearwardly from the rearward portion of said nacelle and being fixed relative to said engine, and an upper section movable relative to said bottom wall, said upper section including rearwardly extending spaced sidewalls and a rearwardly extending top wall joined to the upper portions of said spaced sidewalls, said sidewalls and said top wall terminating in rearward edges, said sidewalls and said top wall having forward edges,
first means mounting said upper section on said bottom section for movement between a first position in which said forward edges abut the rearward portion of said nacelle, said forward edges being separable from the rearward portion of said nacelle, and in which said rearward edges of said upper section are so oriented in relation to said bottom wall to form an exhaust nozzle opening for directing exhaust gases rearwardly from said engine and a second position in which said upper section is moved to a location wherein said rearward edges abut said bottom wall and wherein said sidewalls and said top wall are so oriented in relation to said bottom wall to block the rearward flow of exhaust gases from said engine and wherein said forward edges of said upper section are translated rearwardly and upwardly from the rearward portion of said nacelle and are so oriented in relation to the rearward portion of said nacelle to form an exhaust nozzle opening for discharging the exhaust gases from said engine in an upward and forward direction relative to said engine,
at least one passage means located in said nacelle and having an inlet communicating with said fan duct and an outlet communicating with the exterior of said nacelle, said passage means so oriented and constructed in relation to said engine to divert at least a portion of said fan air from said fan duct and to direct said portion of said fan air downwardly and forwardly relative to said engine,
valve means associated with said passage means for selectively opening and closing said passage means to flow of fan air therethrough,
first actuating means coupled to the upper section of said exhaust nozzle means for selectively moving said upper section between said first and second positions,
panel means associated with the upper section of said exhaust nozzle means, said panel means having a top wall positioned in stacked relationship with the top wall of said upper section and positioned forwardly of and adjacent to the rearward edge of the top wall of said upper section, the top wall of said panel means terminating in a rearward edge adjacent the rearward edge of the top wall of said upper section,
second means mounting said panel means on the upper section of said exhaust nozzle means for movement between a nonrestrictive position wherein said panel means is so oriented relative to said upper section to be in noninterfering relationship with the exhaust nozzle opening formed by said upper section when the latter is in said first position and a restricting position wherein the rearward edge of said panel means is moved downwardly relative to the top wall of said upper section thereby to form an exhaust nozzle opening in conjunction with the upper and bottom sections of said exhaust nozzle means which has a lesser outlet area than the exhaust nozzle opening formed by said upper and bottom sections when said upper section is in said first position and said panel means is in said nonrestrictive position, and
second actuating means coupled to said panel means for selectively moving said panel means between said first and second positions.

7. The apparatus of claim 6 wherein said first means mounts the upper section of said exhaust nozzle means for fore and aft pivotal movement about a first axis transverse to the discharge direction of exhaust gases from said exhaust nozzle means, wherein the top wall of said panel means has transversely spaced side members connected to the top wall of said panel means and extending downwardly therefrom, said second means mounting said side members to respective ones of the sidewalls of the upper section of said exhaust nozzle means for fore and aft pivotal movement about a second axis transverse to the discharge direction of exhaust gases from said engine, said second axis being spaced from said first axis, and wherein said second actuating means includes linkage means pivotally connected to at least one of said side members along an axis coincident with said first axis when said panel means is in said first position, said linkage means being operatively coupled to said valve means to open and close said passage means to flow as said panel means is moved respectively between said restricting and nonrestrictive positions.

8. The apparatus of claim 7 wherein said valve means comprises a door associated with said passage means and means mounting said door on said nacelle for movement between a closed position closing said passage means to flow and an open position opening said passage means to flow, said linkage means operatively coupled to said door to move said door to said closed position when said panel means is moved to said nonrestrictive position and to move said door to said open position when said panel means is moved to said restricting position.

9. The apparatus of claim 6 wherein the top wall of the upper section of said exhaust nozzle means includes a bottom surface having a recess therein extending upwardly into the top wall of said upper section, and wherein the top wall of said panel means has a bottom surface, said recess being so sized and located relative to said panel means when the latter is in said first position as to receive the top wall of said panel means in nested relationship with the top wall of said upper section, thereby causing the bottom surfaces of said top walls to form substantial continuum.

10. The apparatus of claim 6 wherein said turbofan engine is mounted on and operatively associated with an aircraft wing, said exhaust nozzle means being so oriented relative to said wing to discharge said exhaust gases rearwardly across the upper airfoil surface of said wing when said upper section thereof is in said first position, said passage means so oriented to selectively discharge exhaust gases downwardly and forwardly relative to said wing.

* * * * *